US010311353B1

(12) United States Patent
Diorio et al.

(10) Patent No.: US 10,311,353 B1
(45) Date of Patent: Jun. 4, 2019

(54) RFID INTEGRATED CIRCUITS WITH ELECTRICAL BRIDGES

(71) Applicant: Impinj, Inc., Seattle, WA (US)

(72) Inventors: Christopher J. Diorio, Shoreline, WA (US); Todd E. Humes, Shoreline, WA (US); Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 15/788,792

(22) Filed: Oct. 19, 2017

Related U.S. Application Data

(60) Provisional application No. 62/491,728, filed on Apr. 28, 2017.

(51) Int. Cl.
*G06K 7/08* (2006.01)
*G06K 19/06* (2006.01)
*G06K 19/077* (2006.01)

(52) U.S. Cl.
CPC . *G06K 19/07722* (2013.01); *G06K 19/07773* (2013.01)

(58) Field of Classification Search
USPC .............................................. 235/451, 492
See application file for complete search history.

(56) References Cited

U.S. PATENT DOCUMENTS

| 6,693,541 B2* | 2/2004 | Egbert | G06K 19/0726 235/492 |
|---|---|---|---|
| 7,551,141 B1* | 6/2009 | Hadley | G06K 19/07718 343/700 MS |
| 2004/0080902 A1* | 4/2004 | Azdasht | G06K 19/07749 361/820 |
| 2008/0301936 A1* | 12/2008 | Van De Ven | G06K 19/077 29/852 |
| 2013/0140370 A1* | 6/2013 | Finn | G06K 19/07769 235/492 |
| 2014/0070010 A1* | 3/2014 | Diorio | G06K 19/07773 235/492 |

* cited by examiner

*Primary Examiner* — Tuyen K Vo
(74) *Attorney, Agent, or Firm* — Turk IP Law, LLC

(57) ABSTRACT

An RFID integrated circuit, in addition to having conductive pads to electrically couple to an antenna, may also include a conductive bridge configured to electrically connect different portions of the antenna together. In some embodiments, the conductive bridge may be used to form a multi-turn antenna segment.

20 Claims, 13 Drawing Sheets

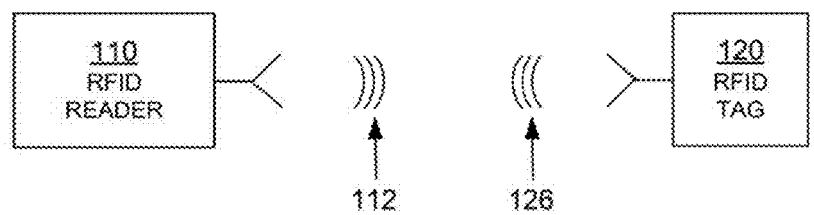
FIG. 1
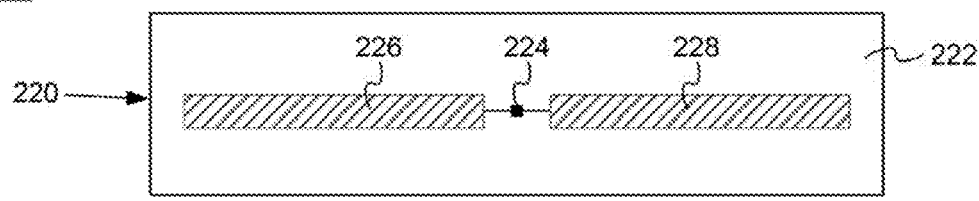
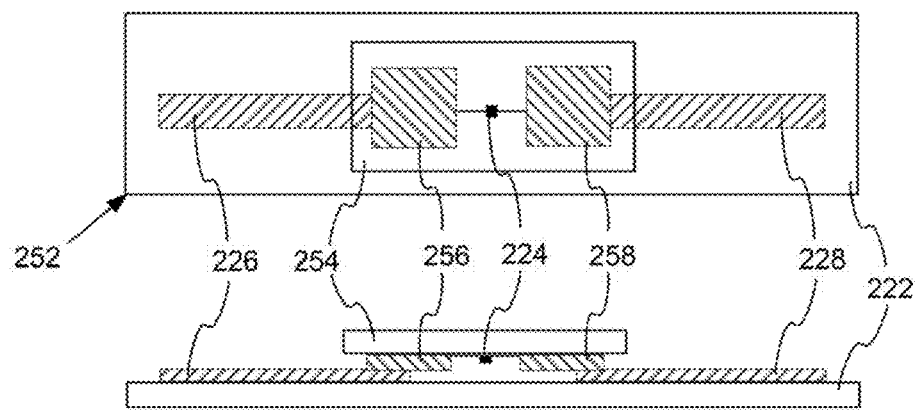
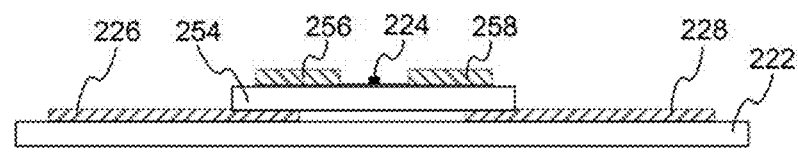
FIG. 2

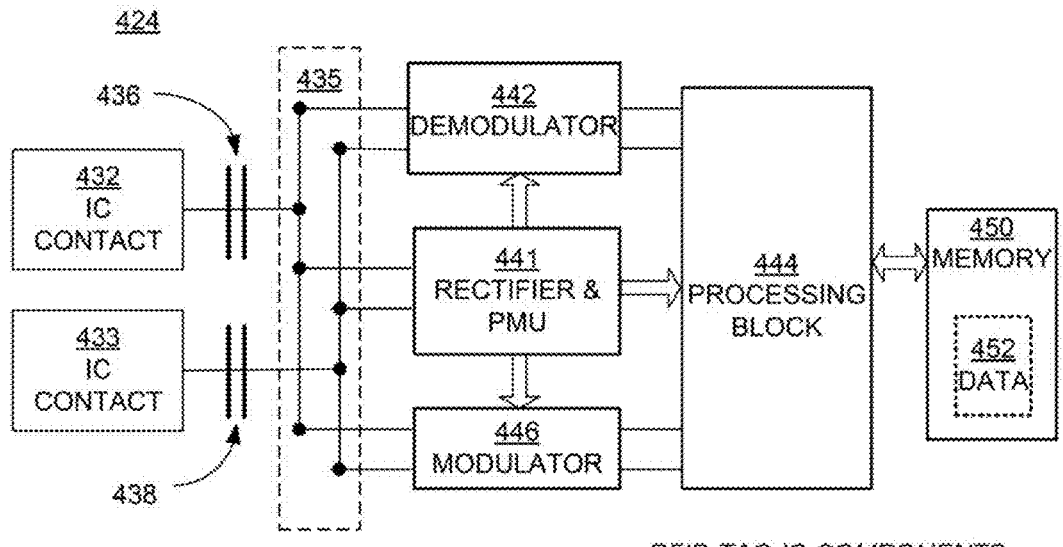
FIG. 4
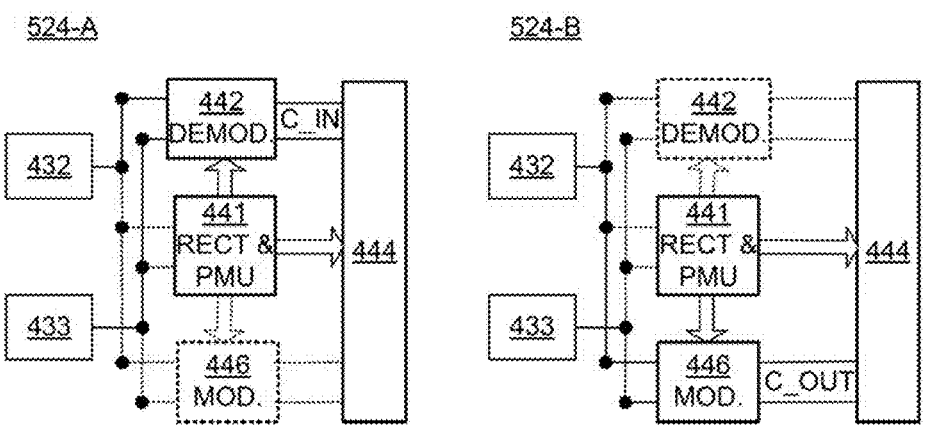
FIG. 5A  FIG. 5B

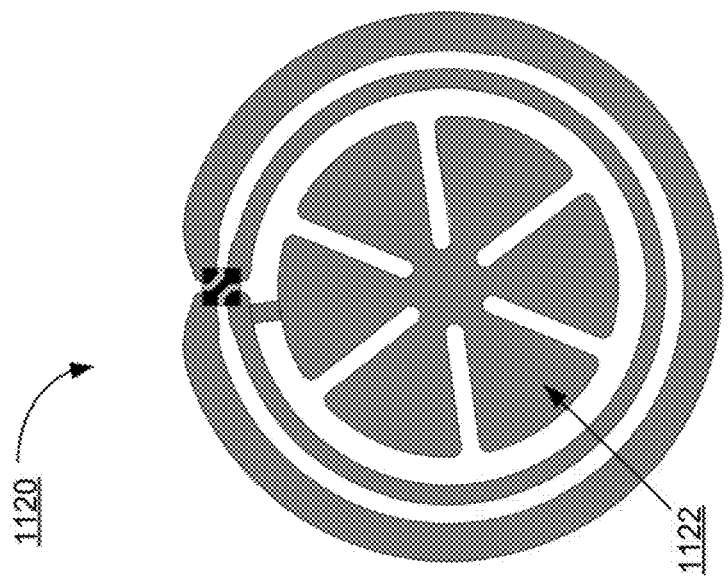
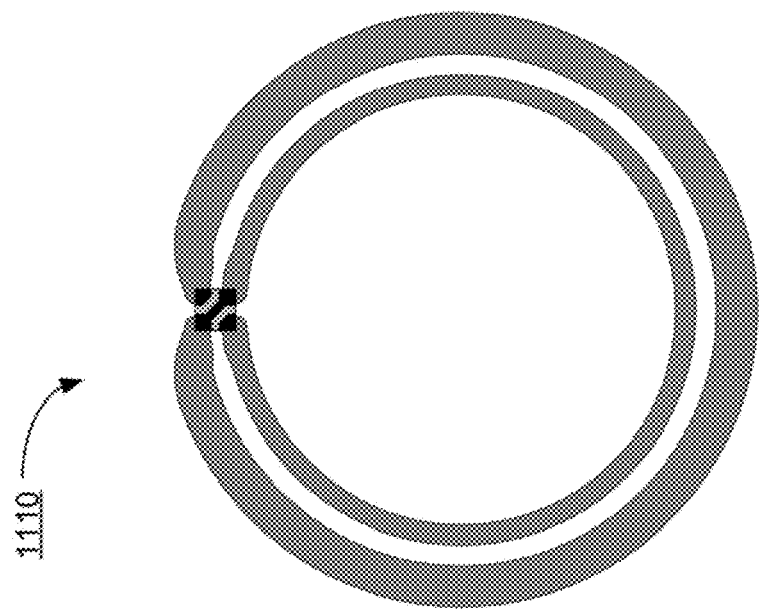
FIG. 11

RFID INTEGRATED CIRCUITS WITH ELECTRICAL BRIDGES

CROSS REFERENCE TO RELATED APPLICATIONS

This application claims the benefit of U.S. Provisional Patent Application Ser. No. 62/491,728 filed on Apr. 28, 2017. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

RFID tags typically include an RFID device, such as an RFID integrated circuit (IC), electrically coupled to a radiating antenna structure on a tag substrate via a tuning loop that helps to match the impedance of the antenna structure to the input impedance of the IC. During operation, such an RFID tag, if passive, extracts power from RF signals incident on the radiating antenna structure to power device components. The incident RF signals, and therefore the extracted power, often are at relatively low voltage, which constrains the operation of device components.

The voltage of the extracted power can be increased using a transformer structure on the tag. The input and output voltages of a transformer are related by the ratio of the number of turns in the transformer primary winding to the number of turns in the transformer secondary winding.

Multi-loop tuning structures can improve impedance-matching between the IC and the antenna structure and reduce the tuning structure footprint on the tag. In addition, multi-loop tuning structures, in conjunction with a radiating antenna structure, can serve as transformer structures to increase the voltage of power extracted from incident RF signals. However, as IC sizes decrease, suitable multi-loop structures become more difficult to fabricate on the tag substrate, due to precision limitations associated with the fabrication process.

Electrically-conductive bridges on RFID ICs can be used to overcome multi-loop fabrication issues. Processes for fabricating conductive bridges on RFID ICs can achieve higher precision than processes for fabricating conductive structures on tag substrates.

Embodiments are directed to an RFID integrated circuit having conductive pads and a conductive bridge. The conductive pads are configured to couple to an antenna, and the conductive bridge is configured to electrically connect different portions of the antenna together, for example to form a multi-loop antenna segment.

In one example, an RFID tag integrated circuit (IC) assembly is provided. The IC assembly may include a semiconductor substrate including circuitry, a nonconductive repassivation layer disposed on the substrate and over the circuitry, a first contact pad, a second contact pad, and a conductive bridge. The repassivation layer may be confined within a perimeter of and form a substantial portion of a surface of the substrate. The first contact pad may be at least partly disposed on the repassivation layer, confined within the perimeter of the surface, disposed near a periphery of the surface, and configured to couple the circuitry to an antenna terminal. The second contact pad may be at least partly disposed on the repassivation layer, confined within the perimeter of the surface, disposed near a periphery of the surface diametrically opposite the first contact pad, and configured to couple the circuitry to another antenna terminal. The conductive bridge may be disposed between the first and second contact pads, substantially span a diameter of the surface, disposed substantially on the repassivation layer, and electrically isolated from the first contact pad, the second contact pad, and the circuitry.

In another example, a method of forming an RFID tag structure including an RFID IC and a two-turn planar antenna loop is provided. The method may include providing the RFID IC, providing first and second concentric loops of the two-turn antenna loop, and attaching the IC to the first and second concentric loops. The IC may include a semiconductor substrate including circuitry, a nonconductive repassivation layer disposed on the substrate and over the circuitry, a first contact pad, a second contact pad, and a conductive bridge. The repassivation layer may be confined within a perimeter of and form a substantial portion of a surface of the substrate. The first contact pad may be at least partly disposed on the repassivation layer, confined within the perimeter of the surface, disposed near a periphery of the surface, and configured to couple the circuitry to a first antenna terminal. The second contact pad may be at least partly disposed on the repassivation layer, confined within the perimeter of the surface, disposed near a periphery of the surface diametrically opposite the first contact pad, and configured to couple the circuitry to a second antenna terminal. The conductive bridge may be disposed between the first and second contact pads, substantially span a diameter of the surface, disposed substantially on the repassivation layer, and electrically isolated from the first contact pad, the second contact pad, and the circuitry. The first loop may have a first discontinuity forming the first antenna terminal and a third antenna terminal. The second loop may have a second discontinuity forming the second antenna terminal and a fourth antenna terminal. The first and second discontinuities may be at substantially the same azimuth. The IC may be attached to the first and second concentric loops such that the first contact pad connects to the first antenna terminal, the second contact pad connects to the second antenna terminal, and the bridge electrically couples the third and fourth antenna terminals together.

In yet another example, a method of forming an RFID tag including an RFID IC, a two-turn planar antenna loop, and a radiating antenna structure is provided. The method may include providing the RFID IC, providing first and second concentric loops of the two-turn antenna loop, attaching the IC to the first and second concentric loops to form an antenna segment, and coupling the antenna segment to the radiating antenna structure. The IC may include a semiconductor substrate including circuitry, a nonconductive repassivation layer disposed on the substrate and over the circuitry, a first contact pad, a second contact pad, and a conductive bridge. The repassivation layer may be confined within a perimeter of and form a substantial portion of a surface of the substrate. The first contact pad may be at least partly disposed on the repassivation layer, confined within the perimeter of the surface, disposed near a periphery of the surface, and configured to couple the circuitry to a first antenna terminal. The second contact pad may be at least partly disposed on the repassivation layer, confined within the perimeter of the surface, disposed near a periphery of the surface diametrically opposite the first contact pad, and configured to couple the circuitry to a second antenna terminal. The conductive bridge may be disposed between the first and second contact pads, substantially span a diameter of the surface, disposed substantially on the repassivation layer, and electrically isolated from the first contact pad, the second contact pad, and the circuitry. The first loop may have a first discontinuity forming the first antenna terminal and a third antenna terminal. The second loop may have a second discontinuity forming the second antenna terminal and a fourth antenna terminal. The first and second discontinuities may be at substantially the same azimuth. The IC may be attached to the first and second concentric loops such that the first contact pad connects to the first antenna terminal, the second contact pad connects to the second antenna terminal, and the bridge electrically couples the third and fourth antenna terminals together, thereby forming the antenna segment.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 11 depicts physical characteristic variations in multi-turn antenna segments according to embodiments.

DETAILED DESCRIPTION

Figure 3:
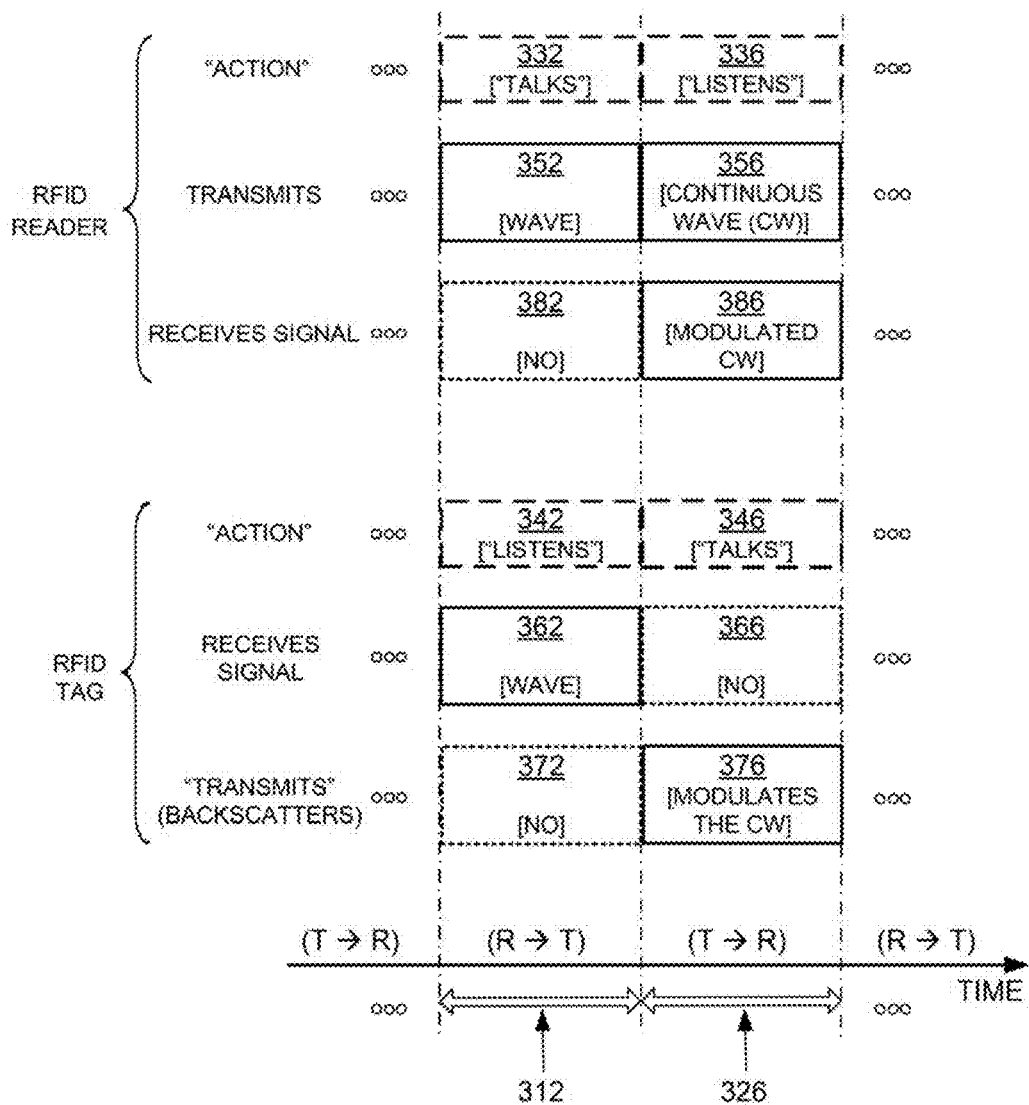
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes circuitry that may be implemented in a semiconducting substrate, resulting in an integrated circuit or IC 224. In some embodiments IC 224 is implemented using complementary metal-oxide semiconductor (CMOS) technology. In other embodiments IC 224 may be implemented using other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein may mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path. In some instances, two elements that are electrically isolated may be coupled together such that an odd-mode excitation of one element results in substantially no odd-mode coupling to the other element.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has main components that are described in this document. Circuit 424 may have additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, series coupling capacitors 436 and/or 438, placed in series between IC contacts 432 and 433, respectively, and signal-routing section 435, galvanically decouple IC contact 432 from IC contact 433, thereby preventing the formation of a short circuit between the IC contacts through the tuning loop.

Series capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Passive RFID tags are configured to harvest power from incident RF signals to operate tag components. Such incident RF signals may have relatively low voltage. Accordingly, power may be extracted from the incident RF signals at relatively low voltages, which limits the operation of tag components.

A passive RFID tag may be configured with a transformer structure to increase the voltage of power extracted from incident RF signals. In a transformer, the output voltage (at the transformer secondary winding) is based on the input voltage (at the transformer primary winding) and a ratio of the number of turns in the transformer secondary winding to the number of turns in the transformer primary winding. Accordingly, the output voltage of a transformer having a secondary winding with more turns than its primary winding is larger than the input voltage. If the antenna of an RFID tag is configured as a transformer structure, with a radiating antenna structure that couples to incident RF signals acting as a transformer primary winding and an antenna segment coupled to an input of the integrated circuit of the RFID tag acting as a transformer secondary winding, then the voltage of an incident RF signal may be stepped up by the transformer structure to result in a higher voltage at the integrated circuit input.

Figure 6:
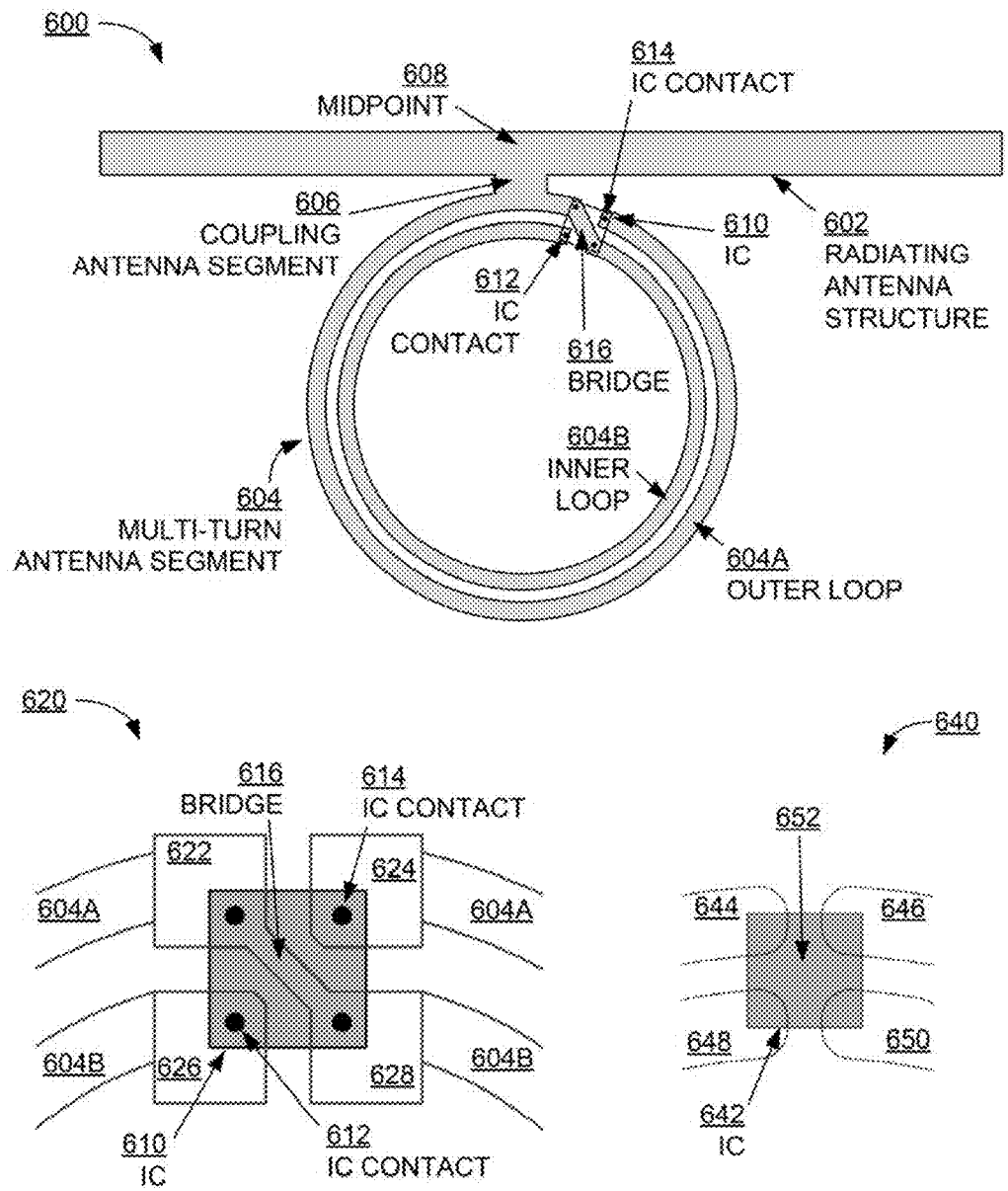
FIG. 6 depicts how a multi-turn antenna segment may be formed on a tag substrate.

FIG. 6 depicts how a multi-turn antenna segment may be formed on a tag substrate. RFID antenna structure 600 includes a radiating antenna structure 602 (in this case a dipole), a multi-turn antenna segment 604, and an RFID IC 610 disposed on the multi-turn antenna segment 604. The radiating antenna structure 602 and the multi-turn antenna segment 604 may both be fabricated on a tag substrate, with the RFID IC 610 later attached to the tag substrate. The multi-turn antenna segment 604 is fabricated to be substantially planar (i.e., lies in a single plane) and includes an outer loop 604A and an inner loop 604B, both also substantially planar. The antenna segment 604 is conductively coupled to a midpoint 608 of the radiating antenna structure 602 via the outer loop 604A and a coupling antenna segment 606. The outer loop 604A and the inner loop 604B are coupled together via bridge 616, forming a concentric two-loop structure. The two-loop structure includes two terminals, one associated with the outer loop 604A and one associated with the inner loop 604B, both electrically connected to RFID IC 610.

Diagram 620 depicts how RFID IC 610 may be electrically coupled to the multi-turn antenna segment 604 of structure 600. The RFID IC 610 includes at least two electrically-conductive IC contacts 612 and 614 disposed on a surface of the RFID IC 610 such that they diametrically oppose each other across the IC 610. In this disclosure, two components of an object diametrically oppose each other or are diametrically opposite each other when the components fall on different sides of a line or plane drawn substantially through the center of the object. The IC contacts 612 and 614 are electrically isolated from each other, but also electrically couple to circuitry within the RFID IC 610 and together form an antenna port. Each of the IC contacts 612 and 614 electrically connect to a terminal of the multi-turn antenna segment 604, thereby electrically coupling the antenna port to the multi-turn antenna segment 604. For example, IC contact 612 is electrically connected to terminal 626, associated with inner loop 604B, and IC contact 614 is electrically connected to terminal 624, associated with outer loop 604A. The IC contacts 612/614 may be bumps, contact pads, or any other structure suitable for forming electrical connections between the IC 610 and the terminals 624/626. Bridge 616 electrically couples the outer loop 604A to the inner loop 604B. For example, outer loop 604A may have a terminal 622, inner loop 604B may have a terminal 628, and bridge 616 may electrically couple terminal 622 to terminal 628. Bridge 616 includes electrically-conductive material, and may be fabricated along with outer loop 604A and inner loop 604B on a tag substrate.

When configured as described, the multi-turn antenna segment 604 may function as a transformer winding, in conjunction with the radiating antenna structure 602, to generate a signal at the contacts 612 and 614 of RFID IC 610 from a lower-voltage signal in the radiating antenna structure 602. For example, an RF signal incident on the structure 600 may induce a sinusoidal voltage signal and related sinusoidal current signal in the radiating antenna structure 602, which may act as a transformer primary winding. The sinusoidal signals couple through the coupling antenna segment 606 to the multi-turn antenna segment 604, which may act as a transformer secondary winding. The multiple turns of the antenna segment 604 may then increase the magnitude of the sinusoidal signal at the coupled antenna port of the RFID IC 610 as compared to the magnitude of the sinusoidal signal in the radiating antenna structure 602.

As technology and yield improvements cause RFID IC sizes to shrink, multi-turn antenna segments such as the multi-turn antenna segment 604 may become more difficult to fabricate entirely on a tag substrate. Diagram 640 depicts an RFID IC 642 that is significantly smaller than RFID IC 610 overlaid on terminals 644-650 of an antenna segment like multi-turn antenna segment 604. In diagram 640, terminals 644-650 may not be spaced far enough apart to accommodate the fabrication of an on-substrate bridge such as the bridge 616, for example due to fabrication process constraints such as design rules.

Figure 7A:
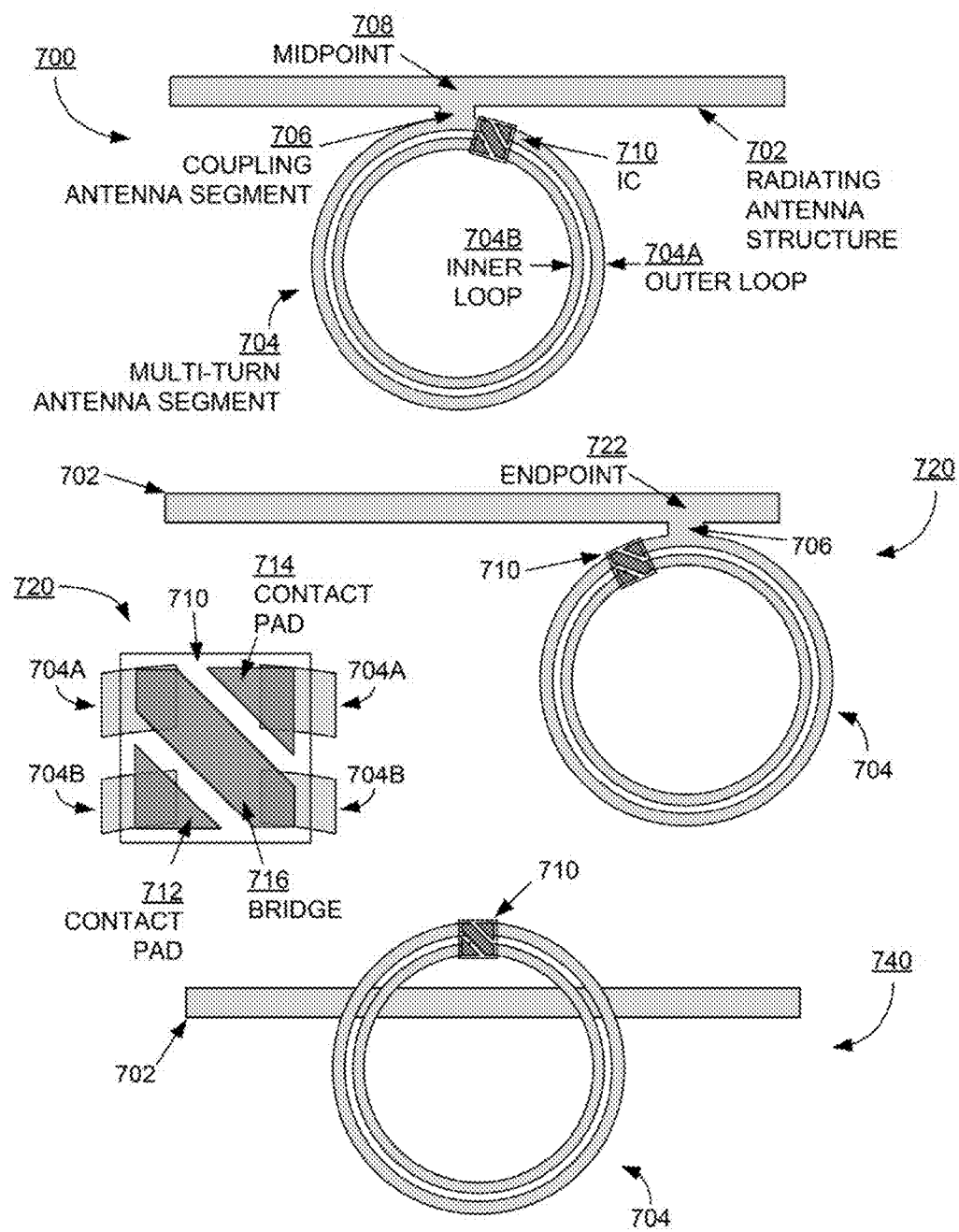
FIG. 7A depicts how a multi-turn antenna segment formed using an RFID integrated circuit with an electrical bridge can couple to a radiating antenna structure to form a transformer.

The spacing issues mentioned above can be addressed using an on-IC electrical bridge or cross-over. FIG. 7A depicts how a multi-turn antenna segment formed using an RFID integrated circuit with an electrical bridge can couple to a radiating antenna structure to form a transformer. RFID antenna structure 700 includes a radiating antenna structure 702 (in this case a dipole), a multi-turn antenna segment 704, and an RFID IC 710 disposed on the multi-turn antenna segment 704. The radiating antenna structure 702 and the multi-turn segment 704 may be fabricated on a tag substrate, and the RFID IC 710 may be subsequently attached to the tag substrate and coupled to the multi-turn segment 704.

The multi-turn antenna segment 704 is substantially planar and includes substantially planar concentric outer loop 704A and inner loop 704B. The antenna segment 704 and its loops may be entirely disposed on one side of a tag substrate, or may be spread between both sides or even at least partly embedded within a tag substrate. The outer loop 704A of the antenna segment 704 is conductively coupled to a midpoint 708 of the radiating antenna structure 702 via a coupling antenna segment 706. The outer loop 704A and the inner loop 704B each have a discontinuity, where each discontinuity has a first terminal and a second terminal disposed clockwise to the first terminal. The discontinuities in the inner loop 704A and the outer loop 704B are located at substantially the same azimuth with respect to the multi-turn segment 704. The azimuth of a point of interest in the multi-turn segment 704 is defined as the angle between a reference vector originating from the center of the shape formed by segment 704 and a vector originating from the center of the shape formed by segment 704 and pointing toward the point of interest. Accordingly, the angle between a reference vector from the center of the segment 704 and a first vector from the center of the segment 704 to the discontinuity in the inner loop 704A is substantially the same as the angle between the reference vector and a second vector from the center of the segment 704 to the discontinuity in the outer loop 704B.

Diagram 720 depicts how the RFID IC 710 may be coupled to the multi-turn antenna segment 704. The RFID IC 710 includes electrically-conductive contact pads 712 and 714 disposed on a surface of the RFID IC 710. In some embodiments, contact pads 712 and 714 are disposed near the periphery or edge of the surface of RFID IC 710, diametrically opposite each other. The IC pads 712 and 714 form an antenna port, and are each electrically coupled to circuitry within the RFID IC 710, optionally electrically coupled to the substrate of the RFID IC 710, but effectively electrically isolated from each other. In some embodiments, the IC pads 712/714 may be coupled to the same circuitry within the RFID IC 710 and still be electrically isolated due to the components and/or layout of the circuitry.

The RFID IC 710 further includes an electrically-conductive bridge 716 disposed between the contact pads 712 and 714, resembling bridge 616 but fabricated on the IC instead of on a tag substrate. The bridge 716 is at least partly disposed on the surface of the RFID IC 710, although in some embodiments part of the bridge 716 may be disposed below the surface of the RFID IC 710 or otherwise covered by another layer. In some embodiments, the bridge 716 may substantially span a diameter of the entire RFID IC 710, stretching between two diametrically opposed edges or corners of a surface of the IC. In other embodiments, the bridge 716 may span most but not all of a diameter of the surface of the RFID IC 710. The bridge 716 is configured to electrically couple the first terminal of outer loop 704A to the second terminal of inner loop 704B to form a continuous multi-turn structure, partly disposed on the RFID IC 710 (e.g., the bridge 716) but mostly disposed on the tag substrate, which can serve as a transformer secondary winding. Accordingly, the bridge 716 is electrically isolated from the contact pads 712/714 and from any circuitry within the RFID IC 710. The other loop terminals (e.g., the second terminal of loop 704A and the first terminal of loop 704B) are electrically connected to the antenna port formed by contact pads 712 and 714.

The bridge 716 can be either electrically isolated from or electrically coupled to the substrate of the RFID IC 710. For example, suppose that the RFID IC 710 (and optionally any coupled antenna structures) is configured to be symmetric, with balanced excitations. In this situation, the substrate of the RFID IC 710 may be considered or at a virtual ground point, and the bridge 716 can be electrically coupled to the substrate without affecting the operation of any transformer structure involving the bridge 716. In such a situation, an odd-mode excitation in the RFID IC 710 may not cause a corresponding odd-mode excitation in the substrate and the coupled bridge 716. In some embodiments, the bridge 716 may be electrically coupled to the substrate of the RFID IC 710 even if the RFID IC 710 is not perfectly symmetric with balanced excitations. This would result in some performance degradation, but may be acceptable in some situations.

FIG. 7A also depicts another RFD antenna structure 730 resembling RFID antenna structure 700. However, instead of coupling to the midpoint of the radiating antenna structure 702, the multi-turn antenna segment 704 conductively couples to an endpoint 732 of the radiating antenna structure 702. In other embodiments, the multi-turn antenna segment 704 may be coupled to the radiating antenna structure 702 at some other point aside from a midpoint or an endpoint of the radiating antenna structure 702.

When thus configured, the multi-turn antenna segment 704 and the electrical bridge 716 of structures 700 and 730 can operate, in conjunction with the radiating antenna structure 702, to generate a signal at the contacts 712 and 714 of RFID IC 710 from a lower-voltage signal in the radiating antenna structure 702, as described above with respect to FIG. 6. An incident RF signal induces a sinusoidal voltage signal and related sinusoidal current signal in the radiating antenna structure 702. The variation of the voltage signal may be largest at the ends of the radiating antenna structure 702, whereas the variation of the current signal may be largest at the midpoint of the radiating antenna structure 702. Accordingly, the coupling between the radiating antenna structure 702 and the multi-turn antenna segment 704 in the structure 700, which occurs at the midpoint 708, may be current-based to take advantage of the relatively large current variation there. Similarly, the coupling between the radiating antenna structure 702 and the multi-turn antenna segment 704 in the structure 730, which occurs at or near the endpoint 722, may be voltage-based to take advantage of the relatively large voltage variation there.

In other embodiments, the coupling between the multi-turn antenna segment 704 and the radiating antenna structure 702 may not be conductive, and may instead be capacitive or inductive. For example, RFID antenna structure 740 depicts how the radiating antenna structure 702 may be superimposed onto and within the area of the multi-turn antenna segment 704 such that an electrical field induced by current in the radiating antenna structure 702 further induces current in the multi-turn antenna segment 704. In this situation, a dielectric or electrically-insulating layer (not shown) may be disposed between the radiating antenna structure 702 and the multi-turn antenna segment 704 to prevent conductive coupling between the two. In one embodiment, antenna structure 702 and antenna segment 704 are disposed on different substrates, and the substrates are placed on each other such that antenna structure 702 at least partly overlaps antenna segment 704, with a dielectric or electrically-insulating layer (e.g., one of the substrates or some additional layer) disposed between antenna structure 702 and antenna segment 704 to prevent conductive coupling. For example, antenna structure 702 may be disposed on a strap (as described in FIG. 2), and the strap subsequently attached to a separate substrate having antenna segment 704. In another embodiment, antenna structure 702 and antenna segment 704 may be disposed on the same substrate, and the substrate may be folded such that antenna structure 702 at least partly overlaps antenna segment 704, with a layer (e.g., part of the substrate or some other layer) disposed between the two to prevent conductive coupling. Inductive coupling between the radiating antenna structure 702 and the multi-turn antenna segment 704 may also be achieved by disposing the radiating antenna structure 702 outside the area of the multi-turn antenna segment 704. In other embodiments, capacitive or inductive coupling between the multi-turn antenna segment 704 and the radiating antenna structure 702 may exist even in the presence of the coupling antenna segment 706.

Figure 7B:
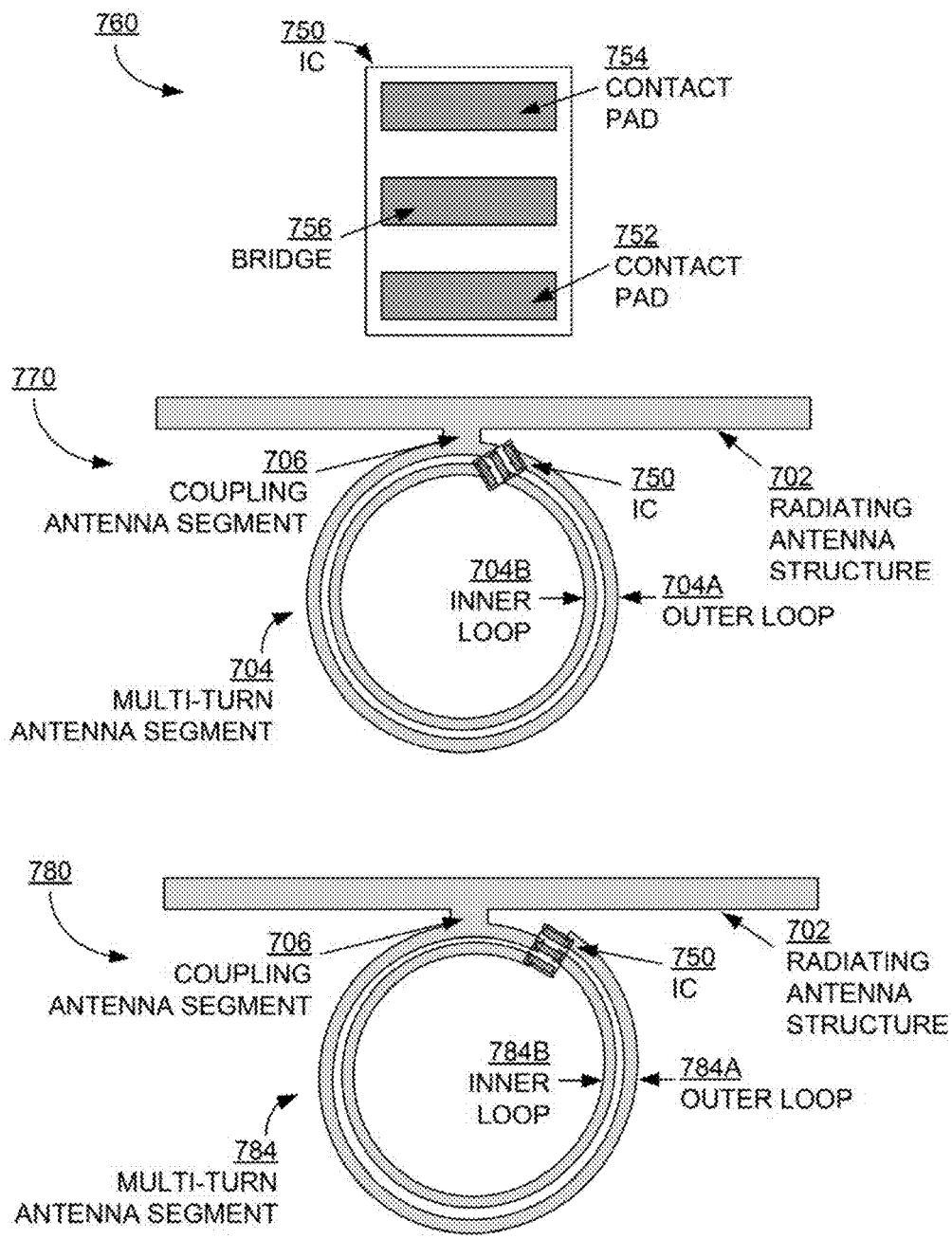
FIG. 7B depicts another configuration for an RFID integrated circuit with an electrical bridge.

FIG. 7B depicts another configuration for an RFID integrated circuit with an electrical bridge. Diagram 760 depicts an RFID IC 750 with electrically-conductive contact pads 752 and 754 disposed on a surface of the RFID IC 750. Similar to RFID IC 710, the contact pads 752 and 754 are disposed near the periphery or edge of the surface of RFID IC 750, diametrically opposite each other. The IC pads 752 and 754 form an antenna port, and are each electrically coupled to circuitry within the RFID IC 750, and optionally electrically coupled to the substrate of the RFID IC 750, but effectively electrically isolated from each other. In some embodiments, the IC pads 752/754 may be coupled to the same circuitry within the RFID IC 750 and still be electrically isolated due to the components and/or layout of the circuitry. In contrast to RFID IC 710, where the contact pads 712/714 are substantially centered near opposing corners of the RFID IC 710, the contact pads 752/754 are substantially centered near opposing sides of the RFID IC 750.

The RFID IC 750 also includes an electrically-conductive bridge 756 disposed between the contact pads 752 and 754, like the bridge 716 except extending between opposing sides of the RFID IC 750 as opposed to extending between opposing corners, as is the case in the RFID IC 710. The bridge 756 is at least partly disposed on the surface of the RFID IC 750, although in some embodiments part of the bridge 716 may be disposed below the surface of the RFID IC 750 or otherwise covered by another layer. Like the bridge 716, the bridge 756 may substantially span a diameter of the entire RFID IC 750, stretching between two opposing sides of the IC. In other embodiments, the bridge 756 may span most but not all of the surface of the RFID IC 750.

The RFID IC 750 may be used to form an RFID antenna structure 770, resembling the RFID antenna structure 700, with similarly-numbered elements operating similarly and the RFID IC 750 oriented to couple its antenna port and bridge to the outer loop 704A and the inner loop 704B appropriately. The RFID IC 750 may also be used to form an RFID antenna structure 780, resembling the RFID antenna structure 700 and 770 except with a multi-turn antenna segment 784 configured to introduce an offset into the terminals of the outer loop 784A and the inner loop 784B. Otherwise, the multi-turn antenna segment 784 and its outer loop 784A and inner loop 784B is analogous to the multi-turn antenna segment 704.

While FIGS. 7A and 7B depict a radiating antenna structure in the form of a dipole, in other embodiments a multi-turn antenna segment may be coupled to other types of antennas, as described above in FIG. 2. Similarly, while the multi-turn antenna segments 704 and 784 depicted above includes two loops, in other embodiments a multi-turn antenna segment may include more than two loops, and a corresponding IC may include multiple bridges disposed between diametrically-opposed contact pads and configured to couple to the loops.

In some embodiments, physical characteristics of a multi-turn antenna segment may be selected based on physical limitations and/or desired electrical characteristics. For example, a multi-turn antenna segment may be designed such that an attached RFID IC has sufficient physical distance from the coupling point between the multi-turn antenna segment and a radiating antenna segment to avoid physical interference and potential parasitic coupling. At the same time, the multi-turn antenna segment design should also reduce electrical performance degradation due to the physical spacing between the RFID IC and the coupling point.

Figure 8:
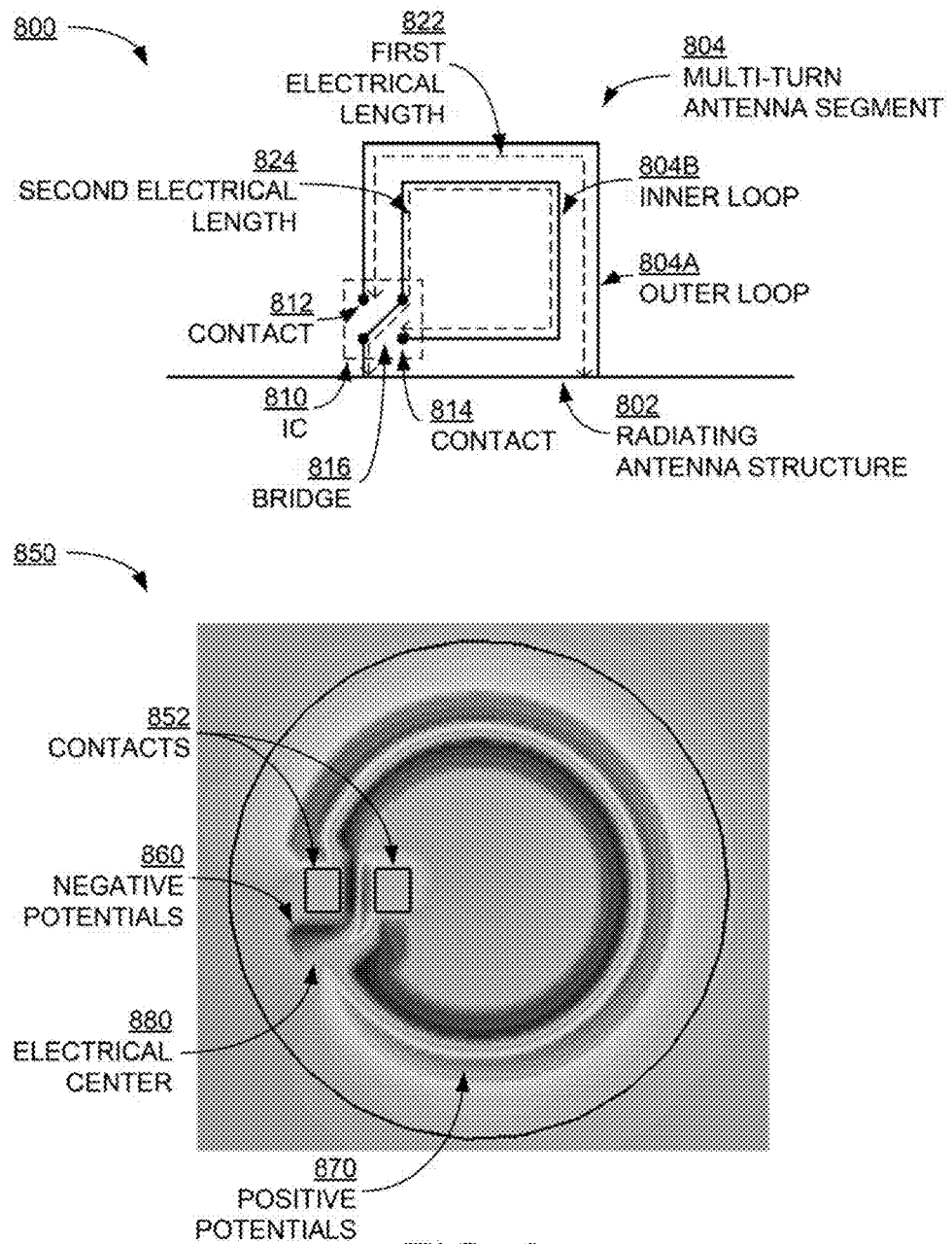
FIG. 8 depicts how electrical characteristics may affect multi-turn antenna segment design, according to embodiments.

FIG. 8 depicts how electrical characteristics may affect multi-turn antenna segment design, according to embodiments. Diagram 800 is a schematic of a radiating antenna structure 802 coupled to a multi-turn antenna segment 804. The multi-turn antenna segment 804 includes an outer loop 804A and an inner loop 804B, and part of the outer loop 804 is shared with the radiating antenna structure 802. The multi-turn antenna segment 804 is in turn coupled to an RFID IC 810. The IC 810 includes contacts 812 and 814, which are coupled to a terminal of the outer loop 804A and a terminal of the inner loop 804B, respectively. The IC 810 further includes a bridge 816, similar to bridge 716, which couples the outer loop 804A and the inner loop 804B together.

The electrical characteristics of the multi-turn antenna segment 804 varies based on the electrical lengths from each of the contacts 812/814 to the radiating antenna structure 802. The electrical length between two points may be defined as the phase shift encountered by a signal of a particular frequency when traveling between the two points, and is related to physical parameters associated with conduction paths between the two points. For example, in diagram 800, a first electrical length 822 between the contact 812 and the radiating antenna structure 802 may run along a majority of the conductive outer loop 804A. A second electrical length 824 between the contact 814 and the radiating antenna structure 802 may run along the conductive inner loop 804B, the bridge 816, and a portion of the conductive outer loop 804A. The first and second electrical lengths 822/824 are based on the diameters, shapes, trace widths, and trace heights of the outer and inner loops 804A/804B, the size and shape of the bridge 816, the electrical characteristics of the coupling between the loops 804A/804B and the bridge 816, and the distance of the IC 810 from the radiating antenna structure 802.

In some embodiments, the multi-turn antenna segment 804 may be designed with an electrical neutral point or center at which it couples to the radiating antenna structure 802. An electrical neutral point or electrical center of a structure may refer to a location on or in the structure where some electrical parameter is zero or substantially zero when the structure is in a fluctuating electric field. Coupling the radiating antenna structure 802 to the multi-turn antenna segment 804 at an electrical center, where the electrical lengths from the electrical center to each of the contacts 812/814 is substantially equivalent, may improve the efficiency of energy transfer between the radiating antenna structure 802, the multi-turn antenna segment 804, and/or the IC 810.

Diagram 850 depicts instantaneous simulated electrical potentials for a two-turn antenna segment like the multi-turn antenna segment 804, coupled to an RF signal and to contacts 852 of an RFID IC, similar to the contacts 812/814. Both negative electrical potentials 860 and positive electrical potentials 870 are present in the simulation. In addition, an electrical center 880 exists, slightly offset from the contacts 852, where electrical potential is zero or very close to zero.

Coupling a radiating antenna structure to the multi-turn antenna segment at the electrical center 880 may provide advantages, such as improved energy transfer efficiency between the radiating antenna structure and the multi-turn antenna segment. However, the separation between the electrical center 880 and the contacts 852 may not be sufficient to avoid physical and electrical interference between the RFID IC and a radiating antenna structure coupled to the multi-turn antenna segment at the electrical center 880. Accordingly, in some embodiments the physical design of the multi-turn antenna segment may be configured to ensure adequate spacing between an attached RFID IC and the point at which the multi-turn antenna segment couples to a radiating antenna structure. For example, certain physical parameters of the multi-turn antenna segment may be selected or designed to ensure adequate physical separation between an RFID IC and a radiating antenna structure while maintaining electrical performance.

Figure 9:
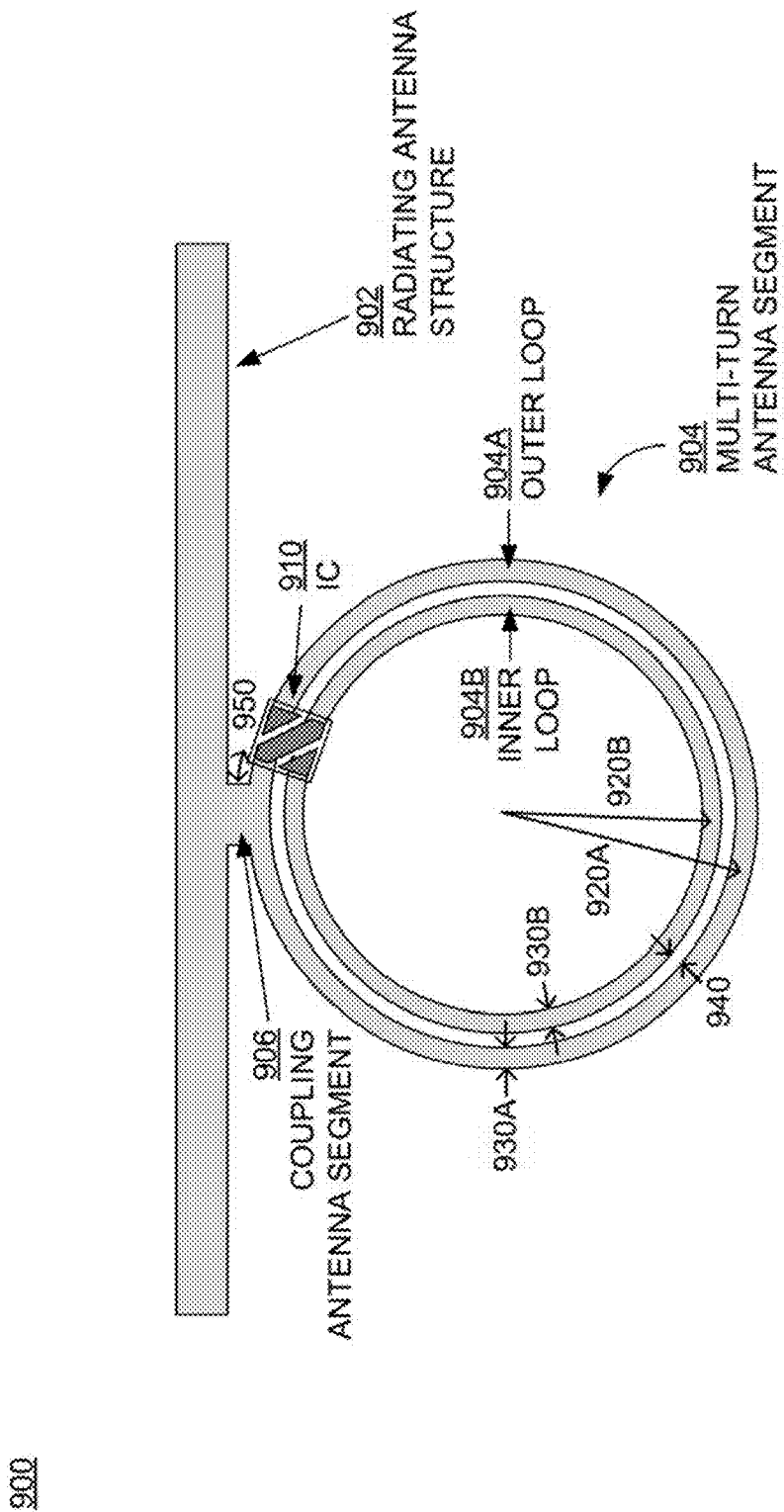
FIG. 9 depicts physical parameters associated with a multi-turn antenna segment, according to embodiments.

FIG. 9 depicts physical parameters associated with a multi-turn antenna segment 904, according to embodiments. As described above, the multi-turn antenna segment 904, which has at least an outer loop 904A and an inner loop 904B and is coupled to IC 910, may act as a transformer secondary winding that couples to a radiating antenna structure 902. One or more physical characteristics of multi-turn antenna segment 904 may be designed or selected to meet physical requirements (e.g., spacing between the IC 910 and the radiating antenna structure 902) and electrical performance requirements (e.g., coupling efficiency). For example, the physical parameters of multi-turn antenna segment 904 may be selected such that the offset 950 from its electrical center (where the radiating antenna structure 902 is coupled via the coupling antenna segment 906) to the attached IC 910 equals or exceeds a minimum dimensional or spacing threshold. In another example, a multi-turn antenna segment configured to couple inductively to a radiating antenna structure may differ in physical characteristics from the multi-turn antenna segment 940, which is configured to conductively or galvanically couple to the radiating antenna structure 902. In yet another example, the physical characteristics of a multi-turn antenna segment may be selected or designed based on environmental characteristics (e.g., humidity, noise, etc.), the tag substrate, desired size or footprint, or any other relevant factor.

Some physical characteristics of the multi-turn antenna segment 904 may include a diameter 920A or a trace width 930A of the outer loop 904A, a diameter 920B or a trace width 930B of the inner loop 904b, and a spacing 940 between the inner loop 904A and the outer loop 904B. Other physical characteristics may include a shape of the outer loop 904A, a shape of the inner loop 904B, a trace height or depth of the outer loop 904A, and/or a trace height or depth of the outer loop 904B. In some embodiments, physical characteristics may vary at different portions of the multi-turn antenna segment 904. For example, the trace widths 930A/930B, the spacing 940, and/or loop height/depth may vary along the outer and inner loops 904A/904B. Loops 904A/904B may be circular, elliptical, rectilinear, nonuniform, or any combination of the previous.

Designing the physical configuration of the multi-turn antenna segment 904 may not only include determining absolute values for the physical characteristics above, but may also include determining ratios or relationships between different physical characteristics. In some embodiments, the diameter 920A and the shape of the outer loop 904A may be chosen to fit on a particular tag substrate, and therefore may be based on the tag substrate size and shape. The physical parameters of the inner loop 904B, along with the trace width 930A and trace height of the outer loop 904A and the inter-loop spacing 940, may then be chosen based on the diameter 920A and the shape of the outer loop 904A to provide electrical lengths such that a desired offset 950 between the IC 910 and the electrical center (where the coupling antenna segment 906 couples to the outer loop 904A) is achieved. For example, the location of the electrical center and therefore the offset 950 may be based on a diameter difference between the outer loop 904A and the inner loop 904B (i.e., a difference between diameters 920A and 920B), a trace-width difference between the outer loop 904A and the inner loop 904B (i.e., a difference between trace widths 930A and 930B), a shape difference between the outer loop 904A and the inner loop 904B, or any other difference that affects the electrical center location.

Figure 10:
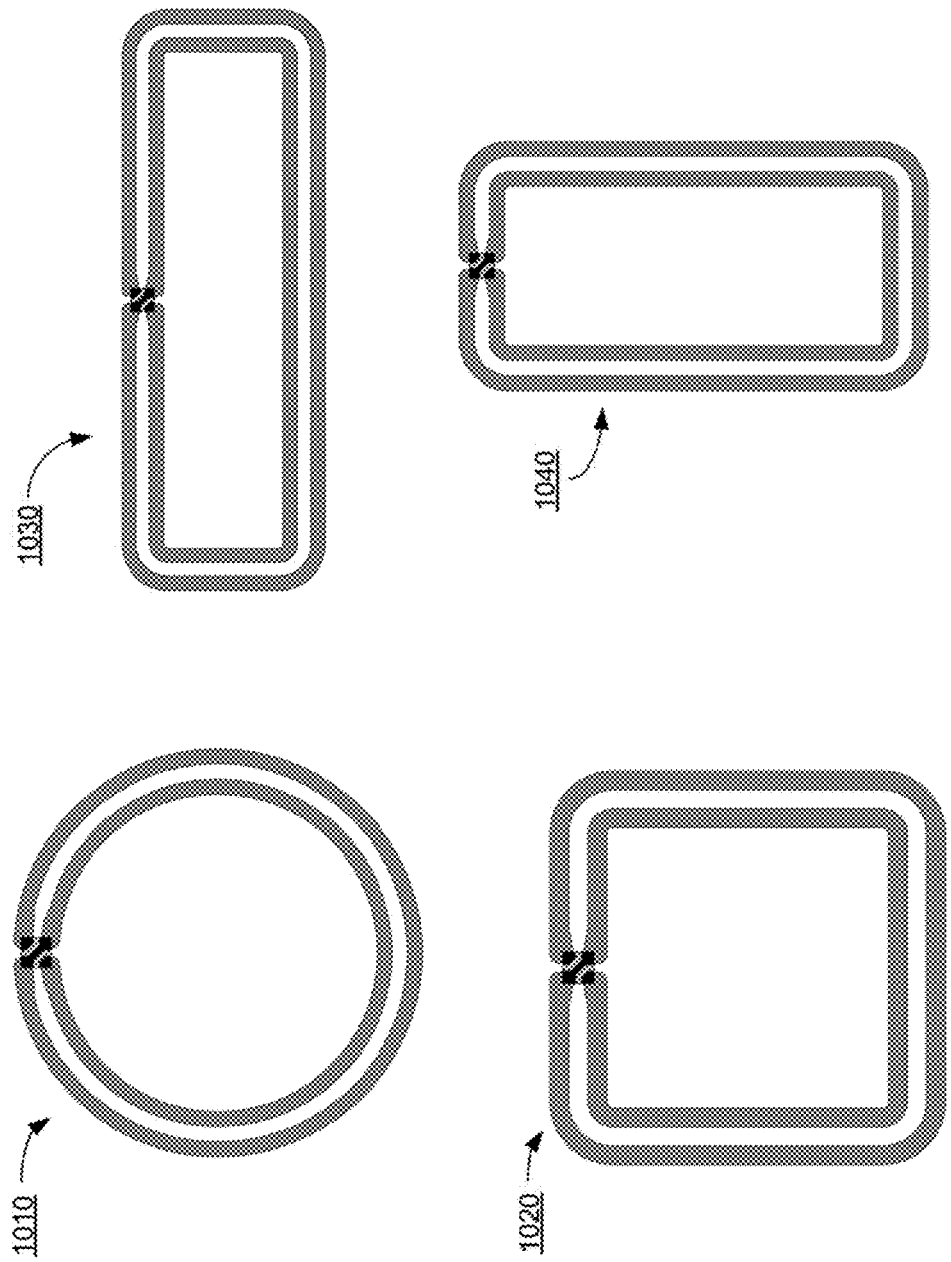
FIG. 10 depicts different configurations for a multi-turn antenna segment according to embodiments.

FIG. 10 depicts different configurations for a multi-turn antenna segment according to embodiments. Configuration 1010 includes circular loops with relatively small trace widths, resulting in relatively high inductance for relatively small loop diameters. Configuration 1020 resembles configuration 1010, except with substantially square loops instead of circular loops. Configuration 1030 has relatively oblong, rectangular loops, with terminals placed on the longer side of the rectangular loops. Configuration 1040 resembles configuration 1030, except with terminals on the shorter side of the rectangular loops. While the terminals in configurations 1020, 1030, and 1040 are all relatively centered along the sides of the square or rectangular loops, in some embodiments the terminals may be offset from the centers of the sides, or may be at the corners.

As described above, the physical characteristics of a multi-turn antenna segment may be designed or selected to provide desired electrical characteristics and performance. For example, the multi-turn antenna segment may be designed such that its electrical center is sufficiently offset from a coupled radiating antenna structure to avoid physical interference. FIG. 11 depicts physical characteristic variations in multi-turn antenna segments according to embodiments. Multi-turn antenna segment 1110 has inner and outer loops with unequal trace width, where the outer loop trace width is larger than the inner loop trace width. The larger outer loop trace width may be selected to compensate for the shorter electrical length of the inner loop, thereby shifting the electrical neutral point of the structure closer to the IC. Multi-turn antenna segment 1120 resembles antenna segment 1110 with the addition of an electrical load 1122 (also referred to as an electric field enhancement feature), configured to adjust the electrical properties of the antenna segment 1120, coupled to and within the center of its inner loop. The electrical load 1122 may be configured to shift the electrical center of multi-turn antenna segment 1120 to adjust the offset between the electrical center and the coupled IC, as described above, or may be configured to adjust some other electrical characteristic of the antenna segment 1120. In some embodiments, an electrical load may be placed outside the multi-turn antenna segment 1120 and may be coupled to its outer loop. In general, such electrical loads are passive, and may be of any design or configuration suitable for adjusting the electrical properties of a coupled antenna segment or structure.

Figure 12:
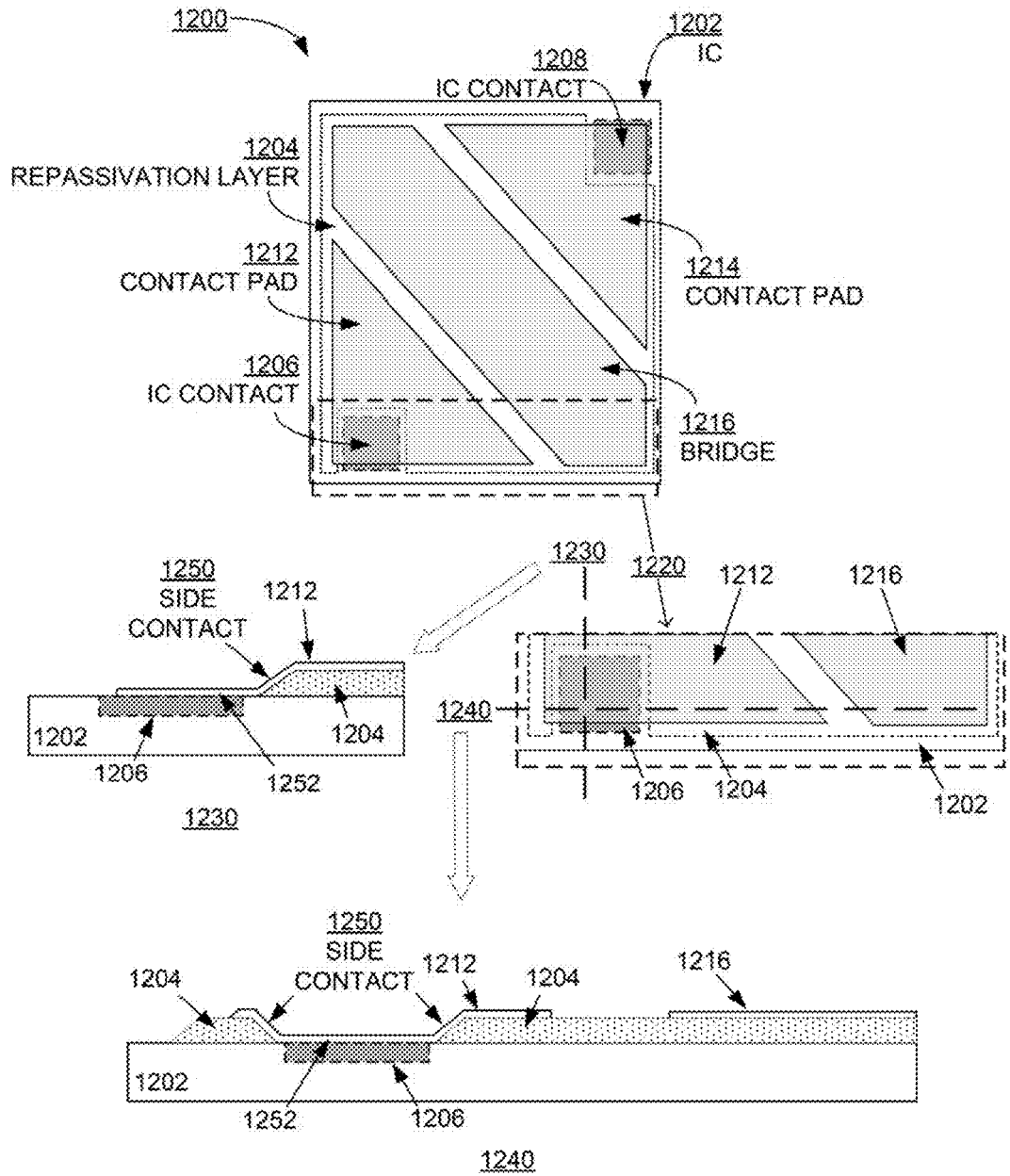
FIG. 12 depicts the structure of an RFID integrated circuit with an electrical bridge according to embodiments.

FIG. 12 depicts the structure of an RFID integrated circuit with an electrical bridge according to embodiments. Diagram 1200 is a top-down view of an RFID IC 1202, similar to the IC 710 in FIG. 7A. The IC 1202 includes two electrically-conductive IC contacts 1206 and 1208 disposed on the surface of the IC 1202 and electrically coupled to circuitry within the IC 1202. An electrically-nonconductive repassivation layer 1204 may be disposed on the surface of the IC 1202. The repassivation layer 1204 may cover a substantial portion of or most of the surface of the IC 1202 while leaving the IC contacts 1206/1208 at least partly exposed, and may be deposited in one or more portions. The repassivation layer 1204 may aid in mitigating variations in coupling capacitance between circuits of the IC 1202 and other antenna or contact structures, and may include organic and/or inorganic material, typically (although not necessarily) with a relatively low dielectric constant and a reasonable thickness to minimize coupling capacitance.

The IC 1202 further includes electrically-conductive contact pads 1212 and 1214 configured to electrically couple to the IC contacts 1206 and 1208, respectively. The contact pads 1212/1214 may be configured to conductively couple to the IC contacts 1206/1208 by physically contacting and covering at least some of the exposed portions of the IC contacts 1206/1208. The contact pads 1212/1214 may also be at least partially disposed on the surface of the repassivation layer 1204, for example to provide a relatively large exposed surface contact area for coupling to other structures, at least as compared to the IC contacts 1206/1208. For example, the contact pads 1212/1214 may be configured to electrically couple to a multi-turn antenna segment as described above.

The IC 1202 may further include an electrically-conductive bridge 1216, like the bridge 716 in FIG. 7A. The bridge 1216 may be disposed entirely or partially on the surface of the repassivation layer 1204. For example, part of the bridge 1216 may be disposed on portions of the IC 1201 without the repassivation layer 1204. In some embodiments, part of the bridge 1216 may be embedded within the repassivation layer 1204, or may be covered by at least a part of the repassivation layer 1204 and/or another layer disposed on the repassivation layer 1204. In any case, the bridge 1216 has exposed surface portions for coupling to other structures, such as a multi-turn antenna segment as described above.

In some embodiments, the contact pads 1212/1214 and/or the bridge 1216 may be formed from portions of an electrically-conductive redistribution layer disposed on the surface of the repassivation layer 1204 and exposed (i.e., not covered by the repassivation layer 1204) portions of the IC 1202, such as the IC contacts 1206/1208. The contact pads 1212/1214 and the bridge 1216 may be formed from a single redistribution layer, or may be formed from multiple redistribution layers.

Diagram 1220 is a close-up, top-down view of a section of the IC 1202. Diagrams 1230 and 1240 are cross-section views of the section depicted in diagram 1220. As depicted in diagrams 1230 and 1240, the contact pad 1212 overlays both at least a portion of the repassivation layer 1204 and at least a portion of the IC contact 1206. The area of the contact pad 1212 around the transition between the repassivation layer 1204 and the IC contact 1206 may be referred to as a "side contact" 1250. The side contact 1250 covers at least a portion of at least one side of the repassivation layer 1204, which may be sloped or beveled, and is disposed around the side of the repassivation layer 1204 to electrically couple a portion 1252 of the contact pad 1212 to the IC contact 1206. The side contact 1250 has one side or surface in contact with the repassivation layer 1204, and may have its opposing side either in contact with another structure or exposed (i.e., not in contact with any structure). The bridge 1216 may also have one or more associated side contacts, for example if the bridge 1216 extends past one or more edges of the repassivation layer 1204 onto the exposed surface of the IC 1202.

In some embodiments, a contact pad (e.g., the contact pad 1212) may not electrically couple to an IC contact (e.g., the IC contact 1206) through a side contact (e.g., the side contact 1250) around a repassivation layer (e.g., the repassivation layer 1204). Instead, the contact pad may electrically couple to the IC contact through an electrically-conductive via through the repassivation layer. For example, the repassivation layer may cover at least a portion of the IC contact, and the contact pad may be disposed on the repassivation layer above the covered IC contact portion. A via structure formed of an electrically conductive material may penetrate the repassivation layer between the contact pad and the covered IC contact portion, and may conductively couple the contact pad and the IC contact.

As described above, the contact pads 1212/1214 and/or the bridge 1210 may be formed from portions of one or more conductive redistribution layers. The conductive redistribution layer may be metal (e.g., copper, aluminum, gold, palladium, or any other suitable metal), doped silicon, graphene, or another material that is electrically conductive or possesses metallic properties, and may be applied or deposited, for example by evaporation, sputtering, or direct transfer. The contact pads 1212, 1214, and the bridge 1210 may be formed during the same deposition process but from separate portions of conductive redistribution layers such that each portion is electrically isolated from the other portions.

In some embodiments, the repassivation layer 1204 and/or any conductive redistribution layers are confined within a surface of the IC 1202. For example, the repassivation layer 1204 may be confined within a perimeter of the IC 1202, and any redistribution layers may be confined within a perimeter of the repassivation layer 1204 or the perimeter of the IC 1202. In other embodiments, the repassivation layer 1204 and/or any redistribution layers may extend beyond the perimeter of IC 1202. For example, a portion of the repassivation layer 1204 may extend beyond the perimeter of the IC 1202, or a portion of any redistribution layers may extend beyond the perimeter of the repassivation layer 1204 (potentially forming side contacts as described above) or the IC 1202.

The repassivation layer 1204 and/or redistribution layer(s) may be deposited in or processed to have certain patterns. For example, the repassivation layer may have a pattern that uncovers all or a portion of underlying IC contacts and/or other portions of the surface of the IC 1202, or may cover the entire surface of the IC 1202, and may be deposited in that pattern or may be patterned after deposition. Similarly, a redistribution layer may have a pattern that includes contact pads (e.g., contact pads 1212/1214), strips (e.g., the bridge 1216), or any other desired shape, may cover all or a portion of underlying IC contacts, and may be deposited in that pattern or may be patterned after deposition. The patterning of the repassivation layer 1204 and/or any redistribution layers may be performed using a masking step to define the desired pattern (e.g., with a masking layer) and an etching step (if masking occurs after layer deposition) or a liftoff/removal step (if masking occurs before layer deposition). In some embodiments, the layers may be applied to another substrate, optionally patterned, and then transferred to IC 1202.

Figure 13:
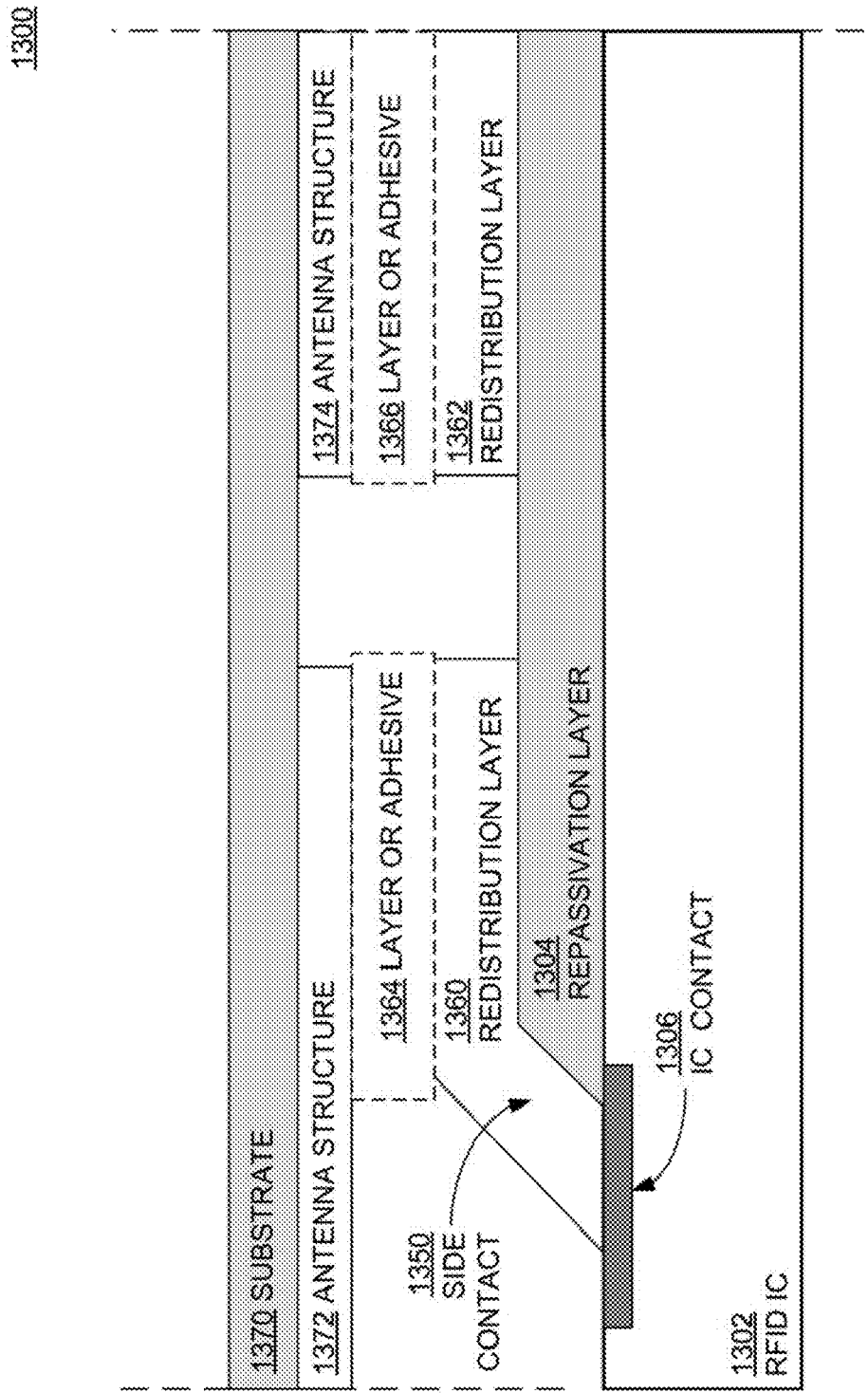
FIG. 13 depicts a detailed cross-section of an RFID integrated circuit according to embodiments.

FIG. 13 illustrates a detailed cross-section 1300 of an RFID integrated circuit according to embodiments. As shown in cross-section 1300, a repassivation layer 1304 is disposed on an IC 1302 to at least partially cover one of its surfaces, leaving other portions of the surface uncovered. In FIG. 13 as shown, the repassivation layer 1304 may leave uncovered a portion of the IC contact 1306. As described above, at least part of an edge of the repassivation layer 1304 may be sloped or beveled.

First and second conductive redistribution layers 1360 and 1362 may be disposed on at least part of the top surface of the repassivation layer 1304. The redistribution layers 1360 and 1362 may be formed from a single redistribution layer (e.g., during the same deposition and/or patterning process) or from multiple redistribution layers. The first redistribution layer 1360, which may form part of a contact pad, may be disposed on the surface of repassivation layer 1304 and down its sloped/beveled side, forming a side contact 1350. The side contact 1350 may further extend beyond the periphery of the repassivation layer 1304 and over at least a portion of the IC contact 1306, coupling galvanically or capacitively to at least a portion of the IC contact 1306. In some embodiments, the extension of the side contact 1350 may couple to the IC contact 1306 directly, without intermediate contacts, bumps, or layers. In other embodiments one or more conductive and/or nonconductive contacts, bumps or layers may be interposed between the extension of the side contact 1350 and the IC contact 1306. In some embodiments, a side contact may couple to another portion of a contact pad that itself electrically-couples to an IC contact, similar to how the side contact 1250 connects to the contact pad portion 1252 in FIG. 12. The second redistribution layer 1362, which may form a part of an electrically-conductive bridge, may be disposed on the top surface of the repassivation layer 1304. In some embodiments, if the bridge extends past the edge or perimeter of the repassivation layer 1304, the second redistribution layer 1362 may also form a side contact similar to the side contact 1350, except without coupling galvanically to circuitry within the IC 1302.

The redistribution layers 1360 and 1362 may also electrically couple to portions of an antenna structure disposed on a substrate 1370. In diagram 1300, the redistribution layer 1360 electrically couples to a first antenna structure 1372, and the redistribution layer 1362 electrically couples to a second antenna structure 1374. For example, the first and second antenna structures 1372 and 1374 may correspond to terminals of a multi-turn antenna segment as described herein.

The redistribution layers 1360 and 1362 may couple to the antenna structures 1372 and 1374 directly or through optional conductive/nonconductive layers or adhesives 1364 and 1366, respectively. The layers 1364/1366 may be configured to attach the IC 1302 to the antenna structures 1372/1374 and/or the substrate 1370, physically and/or electrically. The layers 1364/1366 may include an anisotropic or isotropic conductive adhesive or layer, a patterned conductive adhesive or layer, and/or a nonconductive adhesive or layer. If the layers 1364/1366 are nonconductive then they are typically sufficiently thin as to provide low-impedance capacitive coupling between the antenna structures 1372/1374 and the redistribution layers 1360/1362 at the frequencies of RFID communications.

In some embodiments, the region of electrical coupling between the first redistribution layer 1360 and the first antenna structure 1372 substantially nonoverlaps the region of electrical coupling between the first redistribution layer 1360 and the IC contact 1306. In other words, the projection of the electrical interface area between the first redistribution layer 1360 and the first antenna structure 1372 onto the surface of the IC 1302 does not overlap the projection of the electrical interface area between the first redistribution layer 1360 and the IC contact 1306. The nonoverlap may be facilitated by a side contact such as the side contact 1350. As depicted in diagram 1300, the side contact 1350 electrically couples the IC contact 1306 to the remainder of the first redistribution layer 1360, which in turn is electrically coupled to the first antenna structure 1372. The side contact 1350 may be oriented with a substantially nonvertical slope, and may at least partially conform to a sloped or beveled side surface of the repassivation layer 1304. A first surface of the side contact 1350 may contact and/or be adjacent to a side surface of the repassivation layer 1304, and a second surface of the side contact 1350 opposite the first surface may be exposed and not contact any portion of the IC 1302, the repassivation layer 1304, the layer 1362, the first antenna structure 1372, and/or the substrate 1370. In some embodiments, the second surface of the side contact 1350 may contact an insulating or spacer structure that prevents the side contact 1350 from electrically coupling to an external structure except through the other portions of the first redistribution layer 1360.

A redistribution layer that includes relatively large pads may help to protect the underlying repassivation layer 1304 during IC fabrication. For example, the redistribution layers 1360 and 1362 may serve as an etch mask that covers and prevents etching or damage to underlying portions of the repassivation layer 1304 during processing like that described in U.S. Pat. No. 7,482,251 issued on Jan. 27, 2009, the entirety of which is hereby incorporated by reference.

Figure 14:
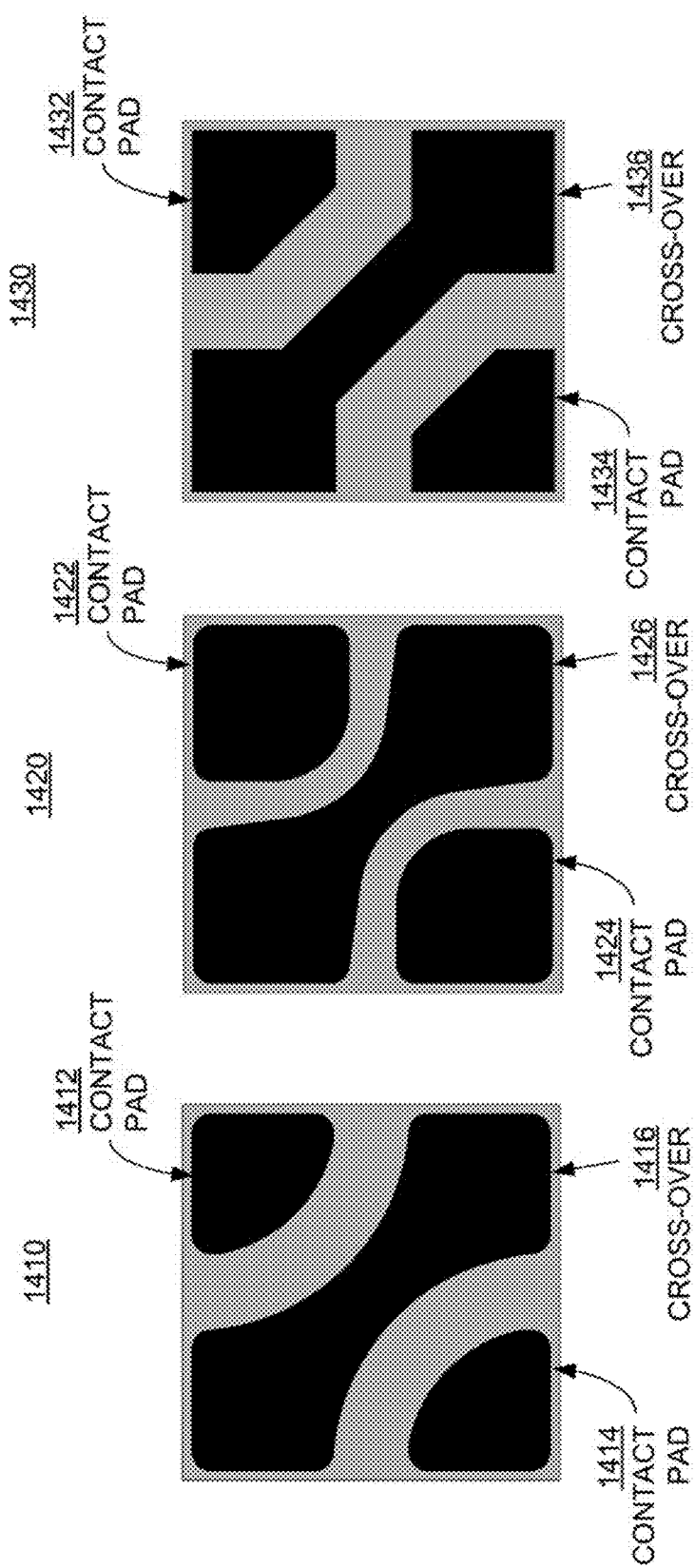
FIG. 14 depicts different configurations for an RFID integrated circuit with an electrical bridge according to embodiments.

FIG. 14 depicts different configurations for an RFID integrated circuit with an electrical bridge according to embodiments. As described above, an RFID IC with an electrical bridge includes at least two contact pads electrically coupled to circuitry within the IC and a conductive electrical bridge disposed between the at least two contact pads. The contact pads and electrical bridge may be configured in any suitable way. Diagram 1410 depicts an IC with contact pads 1412 and 1414 disposed on opposite sides of bridge 1416. Some sides of the contact pads 1412/1414 and the bridge 1416 are curved, and the spacing between each contact pad and the bridge 1416 is substantially uniform. Diagram 1420, resembling diagram 1410, depicts an IC with contact pads 1422 and 1424 disposed on opposite sides of bridge 1416. However, the spacing between each contact pad and the bridge 1426 is not uniform, and becomes smaller toward the center of the IC. Diagram 1430 depicts an IC with contact pads 1432 and 1434 disposed on opposite sides of bridge 1416. Instead of curved sides, the contact pads 1432/1434 and the bridge 1416 are angular and have substantially straight sides. Of course, any other suitable configuration of contact pads and bridge may be suitable.

In one example, an RFID tag integrated circuit (IC) assembly is provided. The IC assembly may include a semiconductor substrate including circuitry, a nonconductive repassivation layer disposed on the substrate and over the circuitry, a first contact pad, a second contact pad, and a conductive bridge. The repassivation layer may be confined within a perimeter of and form a substantial portion of a surface of the substrate. The first contact pad may be at least partly disposed on the repassivation layer, confined within the perimeter of the surface, disposed near a periphery of the surface, and configured to couple the circuitry to an antenna terminal. The second contact pad may be at least partly disposed on the repassivation layer, confined within the perimeter of the surface, disposed near a periphery of the surface diametrically opposite the first contact pad, and configured to couple the circuitry to another antenna terminal. The conductive bridge may be disposed between the first and second contact pads, substantially span a diameter of the surface, disposed substantially on the repassivation layer, and electrically isolated form the first contact pad, the second contact pad, and the circuitry.

In another example, a method of forming an RFID tag structure including an RFID IC and a two-turn planar antenna loop is provided. The method may include providing the RFID IC, providing first and second concentric loops of the two-turn antenna loop, and attaching the IC to the first and second concentric loops. The IC may include a semiconductor substrate including circuitry, a nonconductive repassivation layer disposed on the substrate and over the circuitry, a first contact pad, a second contact pad, and a conductive bridge. The repassivation layer may be confined within a perimeter of and form a substantial portion of a surface of the substrate. The first contact pad may be at least partly disposed on the repassivation layer, confined within the perimeter of the surface, disposed near a periphery of the surface, and configured to couple the circuitry to a first antenna terminal. The second contact pad may be at least partly disposed on the repassivation layer, confined within the perimeter of the surface, disposed near a periphery of the surface diametrically opposite the first contact pad, and configured to couple the circuitry to a second antenna terminal. The conductive bridge may be disposed between the first and second contact pads, substantially span a diameter of the surface, disposed substantially on the repassivation layer, and electrically isolated form the first contact pad, the second contact pad, and the circuitry. The first loop may have a first discontinuity forming the first antenna terminal and a third antenna terminal. The second loop may have a second discontinuity forming the second antenna terminal and a fourth antenna terminal. The first and second discontinuities may be at substantially the same azimuth. The IC may be attached to the first and second concentric loops such that the first contact pad connects to the first antenna terminal, the second contact pad connects to the second antenna terminal, and the bridge electrically couples the third and fourth antenna terminals together.

In yet another example, a method of forming an RFID tag including an RFID IC, a two-turn planar antenna loop, and a radiating antenna structure is provided. The method may include providing the RFID IC, providing first and second concentric loops of the two-turn antenna loop, attaching the IC to the first and second concentric loops to form an antenna segment, and coupling the antenna segment to the radiating antenna structure. The IC may include a semiconductor substrate including circuitry, a nonconductive repassivation layer disposed on the substrate and over the circuitry, a first contact pad, a second contact pad, and a conductive bridge. The repassivation layer may be confined within a perimeter of and form a substantial portion of a surface of the substrate. The first contact pad may be at least partly disposed on the repassivation layer, confined within the perimeter of the surface, disposed near a periphery of the surface, and configured to couple the circuitry to a first antenna terminal. The second contact pad may be at least partly disposed on the repassivation layer, confined within the perimeter of the surface, disposed near a periphery of the surface diametrically opposite the first contact pad, and configured to couple the circuitry to a second antenna terminal. The conductive bridge may be disposed between the first and second contact pads, substantially span a diameter of the surface, disposed substantially on the repassivation layer, and electrically isolated form the first contact pad, the second contact pad, and the circuitry. The first loop may have a first discontinuity forming the first antenna terminal and a third antenna terminal. The second loop may have a second discontinuity forming the second antenna terminal and a fourth antenna terminal. The first and second discontinuities may be at substantially the same azimuth. The IC may be attached to the first and second concentric loops such that the first contact pad connects to the first antenna terminal, the second contact pad connects to the second antenna terminal, and the bridge electrically couples the third and fourth antenna terminals together, thereby forming the antenna segment.

According to some embodiments, the first contact pad is coupled to the circuitry through a via through the repassivation layer or a side contact around the repassivation layer. The first contact, the second contact pad, and the conductive bridge may be formed from the same conductive material and/or during the same deposition process. The IC or IC assembly may further include a first series coupling capacitor configured to couple the first contact pad to the circuitry, a second series coupling capacitor configured to couple the second contact pad to the circuitry, and an antenna segment including the conductive bridge but otherwise not disposed on the substrate and configured to couple the first and second contact pads together. The antenna segment may include a planar two-turn loop, and may be configured to have an electrical center azimuthally offset from the substrate, where the offset may be configured based on a diameter difference between an inner loop and an outer loop of the two-turn loop, a trace-width difference between the inner loop and the outer loop, and/or at least one electrical load coupled to the inner and/or outer loop. The planar two-turn loop, excluding the conductive bridge, may be entirely disposed on one side of a planar substrate. The IC assembly may further include a radiating antenna structure inductively or conductively coupled to the two-turn loop. The circuitry and the conductive bridge may both be electrically coupled to the substrate, where the substrate is configured to operate as a virtual ground point and the conductive bridge is electrically isolated from the circuitry such that an odd-mode excitation in the circuitry results in substantially no odd-mode excitation in the substrate and the conductive bridge.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B. and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) tag integrated circuit (IC) assembly comprising:
   a semiconductor substrate including circuitry;
   a nonconductive repassivation layer disposed on the substrate and over the circuitry, wherein the nonconductive repassivation layer is confined within a perimeter of and forms a substantial portion of a surface of the substrate;
   a first contact pad:
      at least partly disposed on the nonconductive repassivation layer,
      confined within the perimeter of the surface,
      disposed near a periphery of the surface, and
      configured to couple the circuitry to an antenna terminal;
   a second contact pad:
      at least partly disposed on the nonconductive repassivation layer,
      confined within the perimeter of the surface,
      disposed near a periphery of the surface diametrically opposite the first contact pad, and
      configured to couple the circuitry to another antenna terminal; and
   a conductive bridge:
      disposed between the first and second contact pads,
      substantially spanning a diameter of the surface,
      disposed substantially on the nonconductive repassivation layer,
      electrically isolated from the first contact pad, the second contact pad, and the circuitry, and
      configured to, when a multi-loop antenna segment is combined with the IC, couple bridge terminals in the multi-loop antenna segment to form a multi-loop antenna.

2. The IC assembly of claim 1, wherein the first contact pad is coupled to the circuitry through one of:
   a via through the nonconductive repassivation layer, and
   a side contact around the nonconductive repassivation layer.

3. The IC assembly of claim 1, wherein the first contact pad, the second contact pad, and the conductive bridge are formed from the same conductive material.

4. The IC assembly of claim 1, further comprising:
   a first series coupling capacitor configured to couple the first contact pad to the circuitry,
   a second series coupling capacitor configured to couple the second contact pad to the circuitry, and
   an antenna segment including the conductive bridge but otherwise not disposed on the substrate and configured to couple the first and second contact pads together.

5. The IC assembly of claim 4, wherein the antenna segment includes a planar two-turn loop.

6. The IC assembly of claim 5, wherein the planar two-turn loop, excluding the conductive bridge, is entirely disposed on one side of a planar substrate.

7. The IC assembly of claim 5, wherein the antenna segment is configured to have an electrical center offset from the substrate, the offset configured based on at least one of:
   a diameter difference between an inner loop and an outer loop of the two-turn loop;
   a trace-width difference between the inner loop and the outer loop; and
   at least one electrical load coupled to at least one of the inner and outer loops.

8. The IC assembly of claim 5, further comprising a radiating antenna structure one of inductively coupled and conductively coupled to the two-turn loop.

9. The IC assembly of claim 1, wherein:
   the circuitry and the conductive bridge are both electrically coupled to the substrate;
   the substrate is configured to operate as a virtual ground point; and
   the conductive bridge is electrically isolated from the circuitry such that an odd-mode excitation in the circuitry results in substantially no odd-mode excitation in substrate and the conductive bridge.

10. A method of forming a Radio-Frequency Identification (RFID) tag structure including an RFID integrated circuit (IC) and a two-turn planar antenna loop, the method comprising:
   providing the RFID IC, the IC comprising:
      a semiconductor substrate including circuitry;
      a nonconductive repassivation layer disposed on the substrate and over the circuitry, wherein the nonconductive repassivation layer is confined within a perimeter of and forms a substantial portion of a surface of the substrate;
      a first contact pad:
         at least partly disposed on the nonconductive repassivation layer,
         confined within the perimeter of the surface,
         disposed near a periphery of the surface, and
         configured to couple the circuitry to an antenna terminal;
      a second contact pad:
         at least partly disposed on the nonconductive repassivation layer,
         confined within the perimeter of the surface,
         disposed near a periphery of the surface diametrically opposite the first contact pad, and
         configured to couple the circuitry to another antenna terminal; and
      a conductive bridge:
         disposed between the first and second contact pads,
         substantially spanning a diameter of the surface,
         disposed substantially on the nonconductive repassivation layer, and
         electrically isolated from the first contact pad, the second contact pad, and the circuitry;

providing first and second concentric loops of the two-turn antenna loop, wherein:
  the first loop has a first discontinuity forming the first antenna terminal and a third antenna terminal;
  the second loop has a second discontinuity forming the second antenna terminal and a fourth antenna terminal; and
  the first and second discontinuities are at substantially the same azimuth; and
attaching the IC to the first and second concentric loops such that the first contact pad connects to the first antenna terminal, the second contact pad connects to the second antenna terminal, and the bridge electrically couples the third and fourth antenna terminals together and forms a multi-loop antenna from the two-turn antenna loop.

11. The method of claim 10, wherein the first contact pad, the second contact pad, and the bridge are formed during the same deposition process.

12. The method of claim 10, wherein:
  the first contact pad is coupled to the circuitry through a first series coupling capacitor, and
  the second contact pad is coupled to the circuitry through a second series coupling capacitor.

13. The method of claim 10, wherein the two-turn antenna loop is configured to, when attached to the IC, have an electrical center azimuthally offset from the first and second discontinuities, the offset configured based on at least one of:
  a diameter difference between the first and second loops;
  a trace-width difference between the first and second loops; and
  at least one electrical load coupled to at least one of the first and second loops.

14. The method of claim 10, wherein the first and second concentric loops are entirely disposed on one side of a planar substrate.

15. A method of forming a Radio-Frequency Identification (RFID) tag including an RFID integrated circuit (IC), and a two-turn planar antenna loop, and a radiating antenna structure, the method comprising:
  providing the RFID IC, the IC comprising:
    a semiconductor substrate including circuitry;
    a nonconductive repassivation layer disposed on the substrate and over the circuitry, wherein the nonconductive repassivation layer is confined within a perimeter of and forms a substantial portion of a surface of the substrate;
    a first contact pad:
      at least partly disposed on the nonconductive repassivation layer,
      confined within the perimeter of the surface,
      disposed near a periphery of the surface, and
      configured to couple the circuitry to an antenna terminal;
    a second contact pad:
      at least partly disposed on the nonconductive repassivation layer,
      confined within the perimeter of the surface,
      disposed near a periphery of the surface diametrically opposite the first contact pad, and
      configured to couple the circuitry to another antenna terminal; and
    a conductive bridge:
      disposed between the first and second contact pads,
      substantially spanning a diameter of the surface,
      disposed substantially on the nonconductive repassivation layer, and
      electrically isolated from the first contact pad, the second contact pad, and the circuitry;
  providing first and second concentric loops of the two-turn antenna loop, wherein:
    the first loop has a first discontinuity forming the first antenna terminal and a third antenna terminal;
    the second loop has a second discontinuity forming the second antenna terminal and a fourth antenna terminal; and
    the first and second discontinuities are at substantially the same azimuth; and
  attaching the IC to the first and second concentric loops such that the first contact pad connects to the first antenna terminal, the second contact pad connects to the second antenna terminal, and the bridge electrically couples the third and fourth antenna terminals together, thereby forming an antenna segment; and
  coupling the antenna segment to the radiating antenna structure.

16. The method of claim 15, wherein the first contact pad, the second contact pad, and the bridge are formed during the same deposition process.

17. The method of claim 15, wherein:
  the first contact pad is coupled to the circuitry through a first series coupling capacitor, and
  the second contact pad is coupled to the circuitry through a second series coupling capacitor.

18. The method of claim 15, wherein the first and second concentric loops are entirely disposed on one side of a planar substrate.

19. The method of claim 15, further comprising one of:
  coupling the antenna segment to the radiating antenna structure inductively, and
  coupling the antenna segment to the radiating antenna structure conductively.

20. The method of claim 19, wherein the two-turn antenna loop is configured to, when attached to the IC, have an electrical center azimuthally offset from the first and second discontinuities, the offset configured based on at least one of:
  a diameter difference between the first and second loops;
  a trace-width difference between the first and second loops; and
  at least one electrical load coupled to at least one of the first and second loops; and the method further comprises coupling the antenna segment to the radiating antenna structure at the electrical center.

* * * * *

UNITED STATES PATENT AND TRADEMARK OFFICE
CERTIFICATE OF CORRECTION

PATENT NO. : 10,311,353 B1
APPLICATION NO. : 15/788792
DATED : June 4, 2019
INVENTOR(S) : Christopher J. Diorio et al.

Page 1 of 1

It is certified that error appears in the above-identified patent and that said Letters Patent is hereby corrected as shown below:

In the Specification

In Column 5, Line 20, Delete "GSI" and insert -- GS1 --, therefor.
In Column 24, Line 60, Delete "B." and insert -- B, --, therefor.

Signed and Sealed this
Eighth Day of October, 2019

Andrei Iancu
*Director of the United States Patent and Trademark Office*